US009318959B2

(12) United States Patent
Zhang et al.

(10) Patent No.: US 9,318,959 B2
(45) Date of Patent: *Apr. 19, 2016

(54) LOW TOTAL HARMONIC DISTORTION AND HIGH POWER FACTOR CORRECTION POWER CONVERTERS

(71) Applicant: ATMEL CORPORATION, San Jose, CA (US)

(72) Inventors: Hong Zhang, Mountain View, CA (US); Sean S. Chen, Sunnyvale, CA (US); Dilip Sangam, Saratoga, CA (US)

(73) Assignee: Atmel Corporation, San Jose, CA (US)

( * ) Notice: Subject to any disclaimer, the term of this patent is extended or adjusted under 35 U.S.C. 154(b) by 491 days.

This patent is subject to a terminal disclaimer.

(21) Appl. No.: 13/756,409

(22) Filed: Jan. 31, 2013

(65) Prior Publication Data
US 2014/0211518 A1   Jul. 31, 2014

(51) Int. Cl.
*H02M 3/335* (2006.01)
*H02M 1/42* (2007.01)

(52) U.S. Cl.
CPC ........ *H02M 3/33507* (2013.01); *H02M 1/4258* (2013.01); *Y02B 70/126* (2013.01)

(58) Field of Classification Search
CPC .............................. H02M 1/42–1/4258; H02M 3/33507–3/33553
USPC ........................... 363/20–21.18; 323/282–290
See application file for complete search history.

(56) References Cited

U.S. PATENT DOCUMENTS

| 6,944,034 | B1 * | 9/2005 | Shteynberg et al. ........ 363/21.13 |
| 7,511,978 | B2 * | 3/2009 | Chen et al. ...................... 363/97 |
| 7,826,237 | B2 | 11/2010 | Zhang et al. |
| 7,911,812 | B2 * | 3/2011 | Colbeck et al. ............ 363/21.02 |
| 8,207,713 | B2 | 6/2012 | Sugawara |
| 8,373,397 | B2 | 2/2013 | Tanifuji et al. |
| 8,536,851 | B2 | 9/2013 | Lin et al. |
| 2010/0066337 | A1 * | 3/2010 | Gong et al. .................... 323/285 |
| 2011/0110127 | A1 * | 5/2011 | Lee .................................. 363/44 |
| 2011/0157922 | A1 | 6/2011 | Konecny et al. |
| 2011/0249472 | A1 * | 10/2011 | Jain et al. ......................... 363/15 |

OTHER PUBLICATIONS

AN349REV1, "Application Note, Migrating from the L6562 to the CS1601 Power Factor Correction IC," Cirrus Logic, Mar. 2011, 14 pages.
AN-6961, "Critical Conduction Mode PFC Controller," Fairchild Semiconductor, Apr. 2009, 8 pages.
AN-9745, "Design Guide for TRIAC Dimmable LED Driver Using FL7730," Fairchild Semiconductor, Oct. 2014, 11 pages.

(Continued)

*Primary Examiner* — Jessica Han
(74) *Attorney, Agent, or Firm* — Fish & Richardson P.C.

(57) ABSTRACT

A controller circuit for the control of a power converter is disclosed. An example controller circuit generates a waveform that drives a switch that controls the power converter. The controller circuit includes a divider module that generates a modification factor based on a ratio of the two input signals of the module. The circuit includes a module that generates a first waveform configured for a critical conducting mode of operation of a power converter and an on-time adjuster module that modifies the first waveform based on the modification factor and generates a second waveform. The second waveform is delivered to the switch. An example modification factor is the ratio of the output voltage to the rectified input voltage of the power converter.

27 Claims, 5 Drawing Sheets

(56) References Cited

OTHER PUBLICATIONS

HBD853/D, "Power Factor Correction (PFC) Handbook," ON Semiconductor, Apr. 2014, 130 pages.

L6562AT, "Transition-mode PFC controller," STMicroelectronics, Mar. 2009, 25 pages.

* cited by examiner

LOW TOTAL HARMONIC DISTORTION AND HIGH POWER FACTOR CORRECTION POWER CONVERTERS

TECHNICAL FIELD

This disclosure relates generally to electronics and more specifically to Total Harmonic Distortion (THD) and Power Factor Correction (PFC) for circuits driving light emitting devices, such as a Light Emitting Diode (LED).

BACKGROUND

An AC/DC power converter is used to drive a string of LEDs. The AC/DC power converter includes a rectifier circuit for rectifying an AC input voltage into a DC voltage. The DC voltage provides input current to the LEDs. An isolated AC/DC power converter includes a transformer that isolates the output (secondary side) from the input (primary side) of the converter and therefore separate grounds are used for the input and the output of the isolated converter circuit. The AC/DC power converters may include PFC circuitry in the primary side that controls the input current so that the input current stays closely in phase with the waveform of the AC input voltage (e.g., sine wave).

Power converters generally incorporate two modes of operation when dealing with heavy as well as light loads. In Critical Conducting Mode (CrM) the switching converter initiates a new switching cycle immediately after the inductor current in the switching converter goes to zero. In Discontinuous Conduction Mode (DCM) the switching converter initiates a new switching cycle much after the inductor current goes to zero and is typically used for light loads. The CrM is preferred over the DCM because a smaller switching transistor and a smaller transformer are used for CrM. The CrM is commonly selected for full or heavy loads but the load range for the CrM is limited. For light loads the DCM is preferred.

SUMMARY

A power converter with low total harmonic distortion and high power factor correction is disclosed. One aspect features a controller circuit that includes an output node configured for driving a switch. The controller circuit includes a critical conducting mode module configured to generate a first waveform and a divider module configured to generate a modification factor. The controller circuit also includes an on-time adjuster module coupled to the divider module and the critical conducting mode module. The on-time adjuster module is configured to receive the modification factor and the first waveform and to modify the first waveform and generate a second waveform. The second waveform is delivered to the output node.

In some examples, the first waveform and the second waveform are configured for critical conducting mode of operation of a power converter. In some examples, the divider module is configured to receive a first signal and a second signal and it is configured to generate the modification factor as a ratio of the first signal over the second signal. In some examples, the controller circuit includes a first input node configured to receive the first signal and a second input node configured to receive the second signal where the first input node and the second input node are coupled to the divider module. In some constructions, the first input node and the second input node are combined into a single input node and the single input node is configured to receive the first signal and the second signal. A gate driver module is coupled between the output node and the on-time adjuster module and the gate driver module is configured to receive the second waveform and to deliver the second waveform to the output node.

In some constructions, the output node couples to a switch and drives the switch. In some examples, the generation of the second waveform includes modifying a time the first waveform is configured to turn the switch on where the modification is based on a function of the modification factor. In some examples, the controller circuit is coupled to a power converter for output control. In some examples, the first waveform and the second waveform are series of pulses. In some constructions, the circuit is part of an integrated circuit incorporated in a chip. In some examples, the switch is combined into the controller circuit and the combination is part of an integrated circuit incorporated in a power converter chip.

Another aspect features a power converter. The power converter includes a rectifier configured to rectify an alternating input voltage and a transformer magnetically coupling a primary side and a secondary side of the power converter. The transformer includes a primary winding coupled to an output of the rectifier and a secondary winding coupled to an output load of the power converter. The power converter also includes a controller circuit where the controller circuit includes a first input node and a second input node and an output node coupled to a switch. The controller circuit is configured for receiving a first signal proportional to a voltage across the primary winding of the transformer when the switch is on at its first input node and a second signal proportional to an output voltage of the power converter at its second input node. The controller circuit is configured to generate a modification factor proportional to a ratio of the first signal over the second signal and to generate a first waveform configured for a critical conducting mode of operation of the power converter. The controller circuit is also configured to modify the first waveform and generating a second waveform configured for driving the switch where the modification is based on a function of the modification factor and changes a time the first waveform is configured to turn the switch on. The controller circuit provides the second waveform at its output node. The switch of the power converter is coupled between the primary winding of the transformer and the primary side ground and is configured to control the flow of a current in the primary winding of the transformer.

In some constructions, an auxiliary secondary winding of the transformer couples to the second input node of the controller circuit and it is configured to deliver a signal proportional to the output voltage of the power converter. In some examples, an inductor couples in series with a capacitor and the series couples to the alternating input voltage. In some examples, the switch is a transistor and the rectifier is a diode bridge and the power converter is an isolated AC/DC power converter. In some constructions, the first input node and the second input node of the controller circuit are combined into a single input node, and the single input node is configured to receive the first signal and the second signal.

Another aspect features a method of providing a waveform as an output of a controller configured for driving a switch. The method includes receiving a first and a second signal by the controller and generating a modification factor proportional to the ratio of the first signal over the second signal. The method includes generating a first waveform configured for a critical conducting mode of operation of a power converter and modifying the first waveform and generating a second waveform configured for driving the switch. The modification is based on a function of the modification factor and changes a time the first waveform is configured to turn the switch on. The method also includes delivering the second waveform at the output of the controller. The method is performed by one of hardware processors or circuits.

In some examples, the output of the controller is coupled to the switch and drives the switch and the controller is coupled to a power converter for output control. In some constructions, the switch is combined into the controller and the combination is part of an integrated circuit incorporated in a converter chip. In some examples, the first waveform and the second waveform are series of pulses.

Another aspect features a method of controlling a power converter where the power converter includes a controller. The method includes rectifying an alternating input voltage and applying the rectified voltage to a primary winding of a transformer where the primary winding is coupled to a switch and is regulated by the switch and driving an output load by a secondary winding of the transformer. The method includes receiving, a first signal proportional to a voltage across the primary winding of the transformer when the switch is on and a second signal proportional to an output voltage of the power converter by the controller. The controller providing an output waveform configured for a critical conducting mode of operation of the power converter where a time the output waveform is configured to turn the switch on is modified based on a function of a ratio of the first signal over the second signal. The method further includes controlling the power converter by applying the provided output waveform of the controller to the switch. In some examples, the power converter is an AC/DC power converter.

Certain implementations may provide various advantages. For example, implementation of a PFC controller circuit that integrates a divider module and an on-time adjuster module into one circuit provides low THD (e.g., 2.5%) and high PFC during the CrM operation of a power converter. The divider module provides a ratio of the input voltage of the power converter to the output voltage of the power converter and based on the value provided by the divider module the on-time adjuster module, modifies the time the switch of an isolate power converter is turned on. By modifying the on-time of the switch of the power converter, the required low THD and high PFC of the power converter may be achieved and the input line filter may not be required or may be simplified. As an example, the controller circuit is implemented in an integrated circuit chip and controls the lighting of an LED diode string. Further aspects, features, and advantages will become apparent from the following detailed description, the drawings, and the claims.

DETAILED DESCRIPTION

Figure 1A:
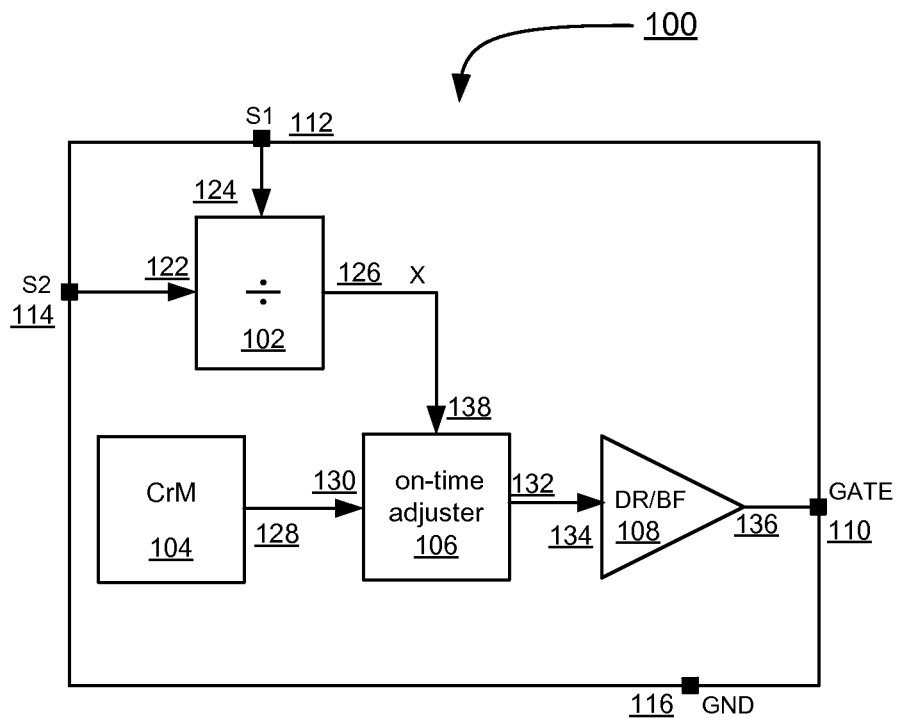
FIG. 1A is a circuit diagram of example circuits that are coupled to an existing PFC circuit to drive a switch.

FIG. 1A is an example controller circuit 100 designed to produce output waveforms for controlling a power converter. The circuit 100 includes a divider module 102 that is coupled to nodes 112 and 114 of the circuit 100 and receives a first signal (S1) from the node 112 and a second signal (S2) from the node 114. The circuit 100 includes a CrM module 104 that produces a waveform (e.g., a series of pulses) suitable when the power converter is operating in the critical conducting mode. The circuit 100 also includes an on-time adjuster module 106 that is coupled to the CrM module 104 and the divider module 102. The DR/BF module 108 is a gate driver/buffer module that is coupled between the on-time adjuster module and an output (GATE) node 110 of the circuit 100 where the GATE node provides the output waveform of the circuit 100. The CrM module 104 generates a first waveform and through its node 128 provides the first waveform to the on-time adjuster module 106. The divider module 102 generates a modification factor (X) based on the received two signals and through its node 126 provides the modification factor to node 138 of the on-time adjuster. The on-time adjuster module 106 modifies the first waveform it receives through its node 130 into a second waveform and provides the second waveform through its node 132 to the DR/BF module 108. The modification performed by the on-time adjuster on the first waveform is based on the modification factor the on-time adjuster module 106 receives. The DR/BF module 108 receives the second waveform through its node 134 and amplifies and/or buffers the waveform and provides the waveform at its node 136 which is coupled to the GATE node 110 of the circuit 100. The provided waveform is delivered at the GATE node of the circuit 100. The circuit 100 includes a ground (GND) node 116 that couples to the ground of the power converter.

Figure 1B:
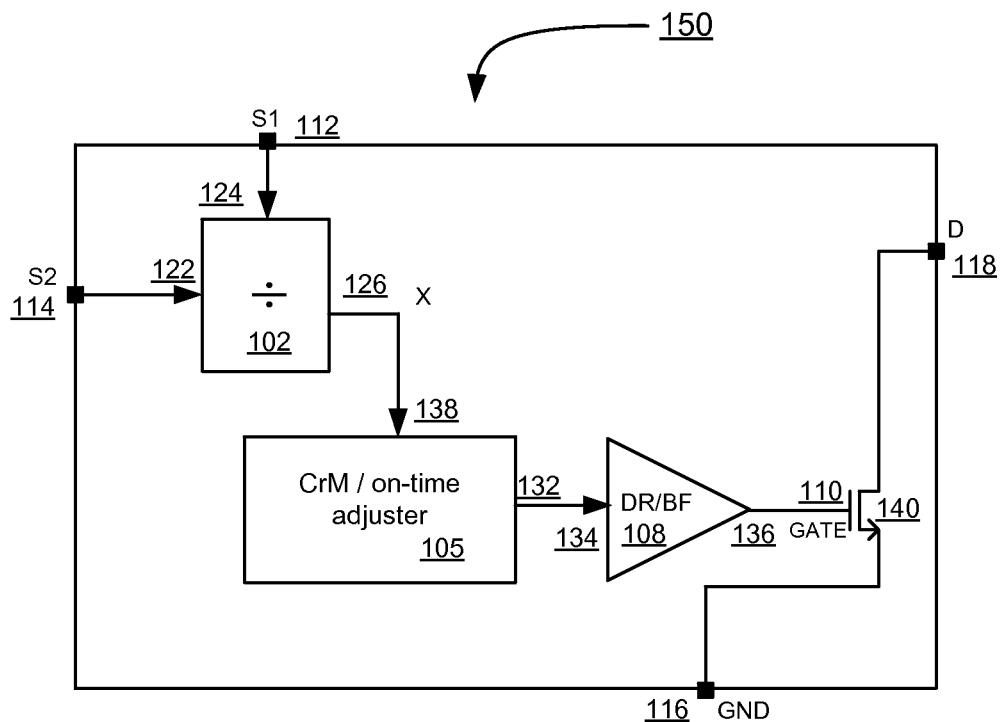
FIG. 1B is an example circuit diagram of FIG. 1A with a switch incorporated into the circuit.

FIG. 1B is an example controller circuit 150 that incorporates a switch 140 (e.g., a transistor) into the circuit 100 and is designed for controlling the flow of current in the primary side of a power converter. The circuit 150 includes modules and coupling nodes of circuit 100 with the same numbers. The switch 140 in the circuit 150 is coupled to the DR/BF module 108 through the GATE node 110. The waveform provided by the DR/BF module 108 controls the flow of a current passing through the switch 140 by turning the switch 140 on or off. The circuit 150 further includes the node 118 and the switch 140 is coupled between the node 118 and the ground (GND) node 116. The circuit 150 controls the flow of current between its nodes 118 and 116. The circuit 150 combines the CrM module 104 and the on-time adjuster module 106 of the circuit 100 into one module 105. The CrM/on-time adjuster module 105 produces the second waveform (e.g., a series of pulses) at its node 132 where the second waveform is suitable when the power converter is operating in the critical conducting mode and modified based on the modification factor (X) that the module 105 receives through its node 138 from the divider module 102. In other embodiments, the input nodes 112 and 14 of circuits 100 and 150 may be combined into one input node and receive the signals S1 and S2 from a single node at different times or phases of the operation of the power converter.

The modification factor (X) generated by the divider module 102 is a ratio in the form of a first function (F1) of the first signal divided by a second function (F2) of the second signal as $X=F1(S1)/F2(S2)$. Other embodiments may use linear functions for F1 and/or F2 or may take the simple form of $X=S1/S2$. The first waveform generated by module 104 and the second waveforms generated by module 106 of the circuit 100 and also the second waveform generated by module 105 of circuit 150 are designed to turn a switch on or off. The on-time adjuster module 106 of circuit 100 modifies the first waveform of circuit 100 based on the modification factor X and generates the second waveform of circuit 100. The module 105 of circuits 150 directly generates the second waveform for the critical conducting mode of operational and based on the modification factor X. The second waveform is designed to control the on-time where the on-time is the time a waveform is designed to turn on the switch 140 of circuit 150 or a switch the circuit 100 couples to. The first waveform of circuit 100 has an on-time T1 suitable for CrM operation of a power converter. In circuit 100, the on-time T2 of the second waveform is generated based on T1 such that T1 is modified according to a function G of the modification factor X such that T2=T1 G(X). Other embodiments may use a linear function G or may take the simple form of T2=T1 (1+bX). As an example, b is a value between zero and one. In other embodiments, the signals S1 and S2 are voltages and/or currents and, for example, may be sampled voltages or currents. In circuit 150, the on-time is calculated as described above and directly applied to the second waveform.

In another embodiment, the first waveform and the second waveform are a series of pulses that may be modified using, for example, a pulse width modulation (PWM) scheme. Other embodiments may use circuit 100 or circuit 150 as part of an integrated circuit incorporated in a chip.

Figure 2:
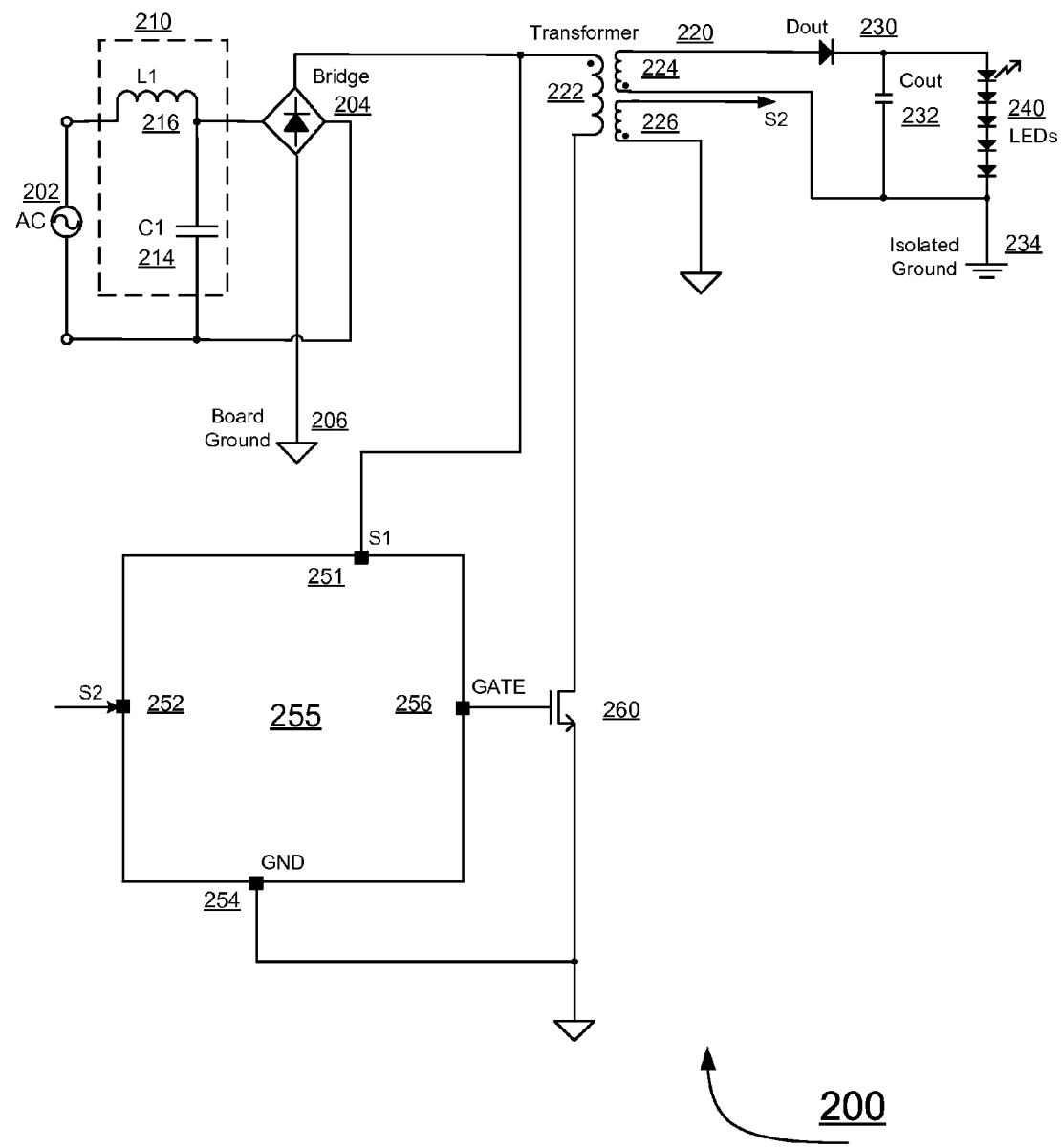
FIG. 2 is an example circuit diagram of an isolated AC/DC power converter with low THD and high PFC driving a string of LEDs.

FIG. 2 is an example of an isolated AC/DC power converter circuit 200 that incorporates the controller circuit of FIG. 1A as its module 255. The isolated AC/DC power converter circuit 200 incorporates a transformer 220 that magnetically couples a primary winding 222 with a secondary winding 224. The primary winding 222 is part of the input circuit with an input ground (Board Ground) 206 and the secondary winding 224 is part of the output circuit with and isolated output ground (Isolated Ground) 234. The output of circuit 200 includes the secondary winding 224 of the transformer 220 that is inversely coupled to its primary winding 222 and is coupled to an anode of a diode 230 from one side and the isolated ground 234 from the other side. A load 240 and an output capacitor 232 are coupled in parallel between the cathode of diode 230 and the isolated ground 234. The example circuit 200 has a string of LEDs 240 as its load. The input of circuit 200 includes the primary winding 222 of the transformer 220 where the primary winding 222 is coupled to the ground 206 through a switch 260 from one side and to a rectifying bridge 204 from the other side. The bridge 204 is supplied through an alternating current line 202. An input line filter 210 for improving THD is coupled to the alternating input voltage 202. In some implementations, the input line filter 210 includes an inductor 216 coupled in series with a capacitor 214, where the capacitor 214 is coupled to the input of the bridge 204. The secondary winding 224 is inversely coupled to the primary winding 222 and because of the orientation of the diode 230, the current through the secondary winding 224 flows when the switch 260 turns off. The circuit 200 additionally includes an auxiliary winding 226 that generates a signal proportional to the voltage of the secondary winding 224.

The module 255 incorporated in circuit 200 is an example of the controller circuit shown in FIG. 1A, where its node 254 is coupled to the primary side ground 206. The module 255 receives a first input signal (S1) proportional to a voltage of the primary winding 222 of the transformer at its input node 251. The module 255 also receives a second input signal (S2) proportional to an output voltage of the isolated power converter at its input node 252. During the CrM operation of the isolated power converter 200, the module 255 generates a CrM waveform where the on-time of the CrM waveform is modified based on the received signals S1 and S2 at nodes 251 and 252. The modified CrM waveform is delivered at node 256 to turn the switch 260 on or off. The amount of time the switch 260 turns on during the CrM operation depends on the values of signals S1 and S2 as described in a paragraph above.

Figure 3:
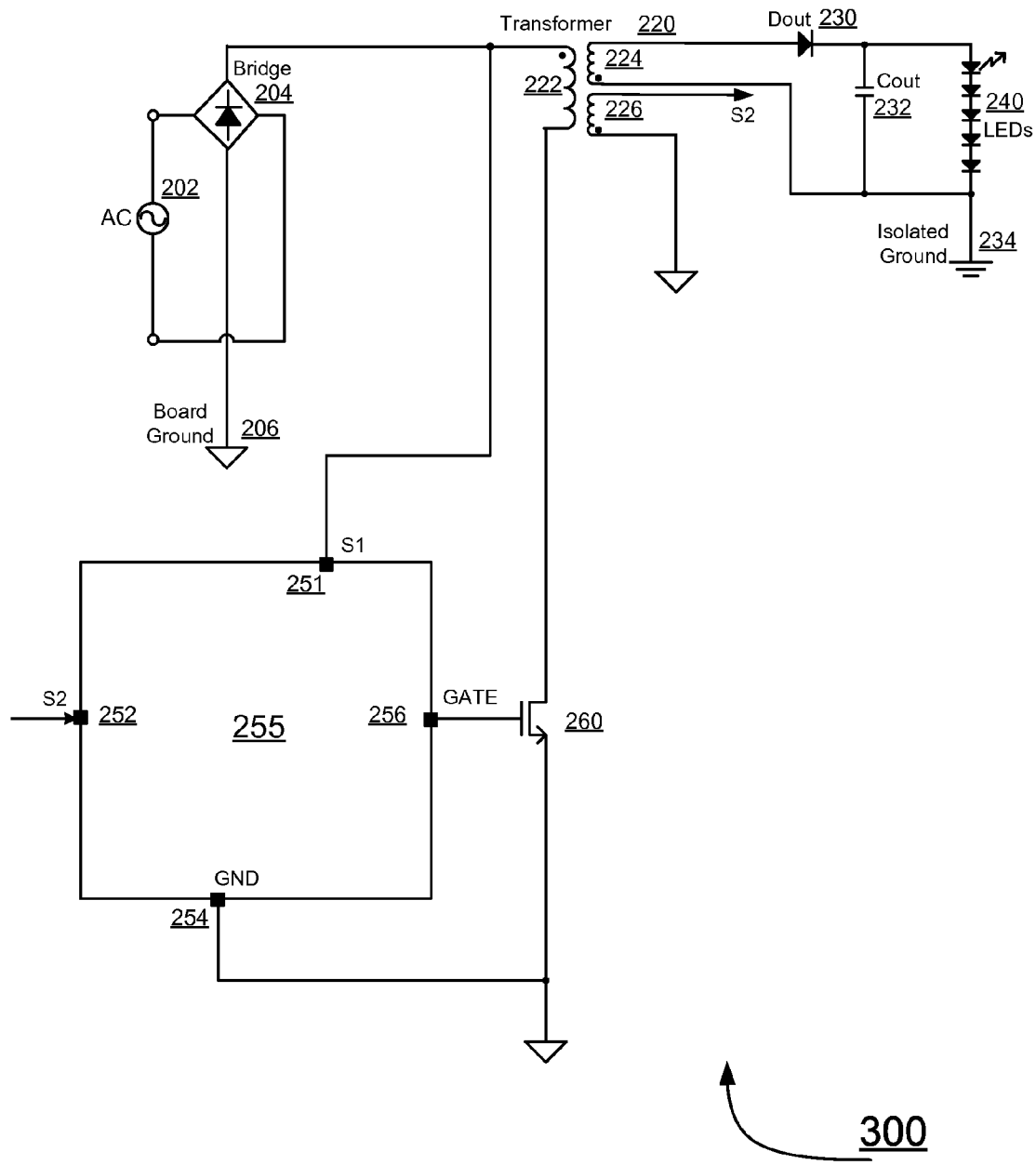
FIG. 3 is an example circuit diagram of FIG. 2 with no input line filter.

FIG. 3 is an example of an isolated AC/DC power converter circuit 300 that incorporates the controller circuit of FIG. 1A as its module 255. The circuit 300 includes the elements of circuit 200 with the same number designations with the exception that the input line filter 210 including the inductor 216 and the capacitor 214 is removed from circuit 300. In circuit 300, the module 255 provides the required low THD and high PFC that the input line filter 210 is not required. The example circuits 200 and 300 are isolated AC/DC power converters. If an inductor replaces the transformer of the circuits 200 and 300, or the primary board ground 206 couples to the secondary isolated ground 234, the input and the output of the converter circuits 200 and 300 do not stay isolated anymore and the power converter is a non-isolated power converter. In other examples of circuits 200 and 300, the input nodes 251 and 252 of module 255 may be combined into one input node and receive the signals S1 and S2 from a single node at different times or phases of the operation of the power converter.

Figure 4:
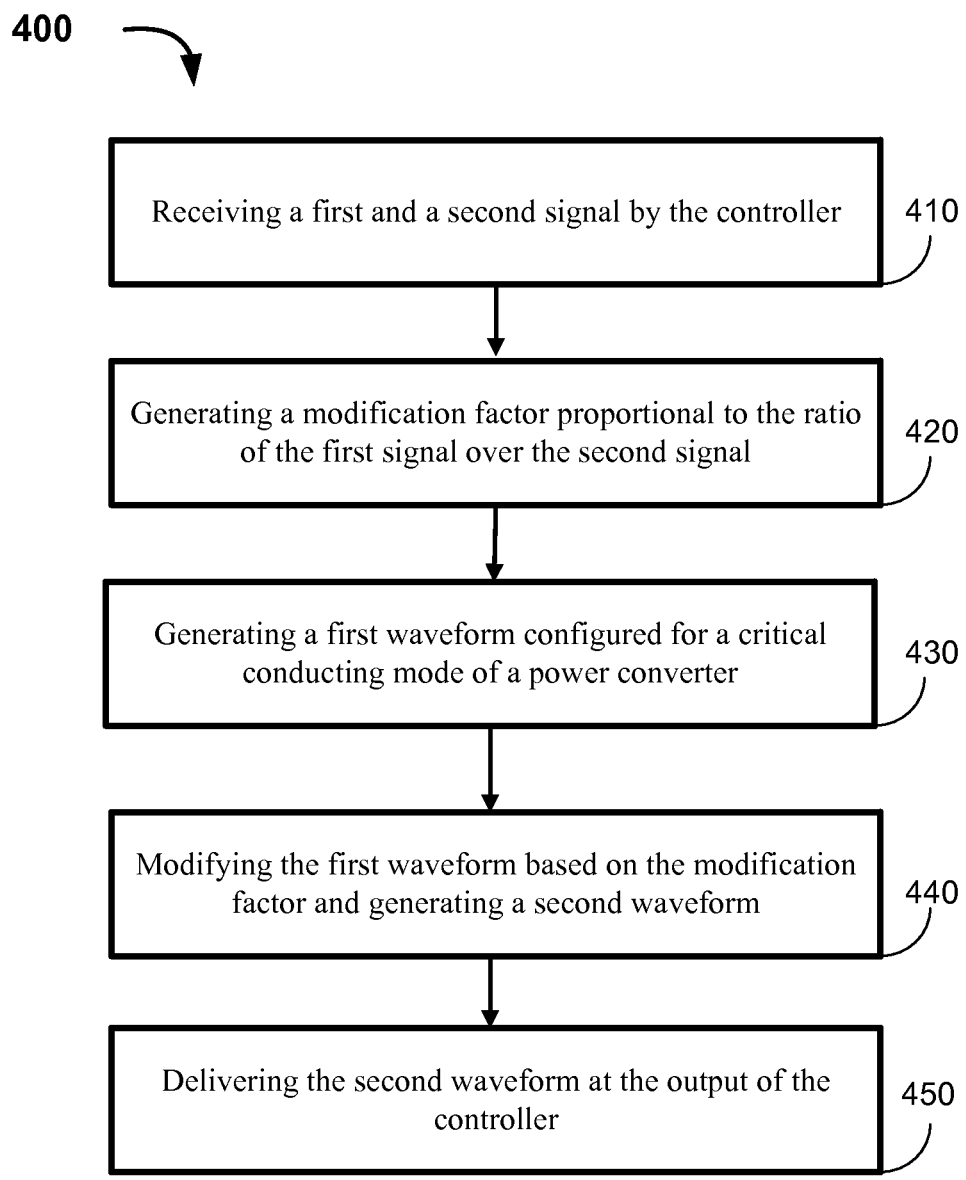
FIG. 4 is an example flow diagram of a method of providing an output waveform of an example circuit as in FIG. 1A.

FIG. 4 is a flow diagram of a process 400 implemented on a controller circuit 100 of FIG. 1A intended for delivery of a waveform to control a switch for the output control of a power converter. The controller receives a first and a second signal in step 410 and generates, based on the received signals, a modification factor in step 420. In step 430, the controller generates a first waveform designed for the CrM operation of a power converter. In step 440 and based on the modification factor of step 420 the first waveform designed for the CrM operation of a power converter is modified and a second waveform is generated. Delivering the second waveform at the output of the controller occurs in step 450.

Figure 5:
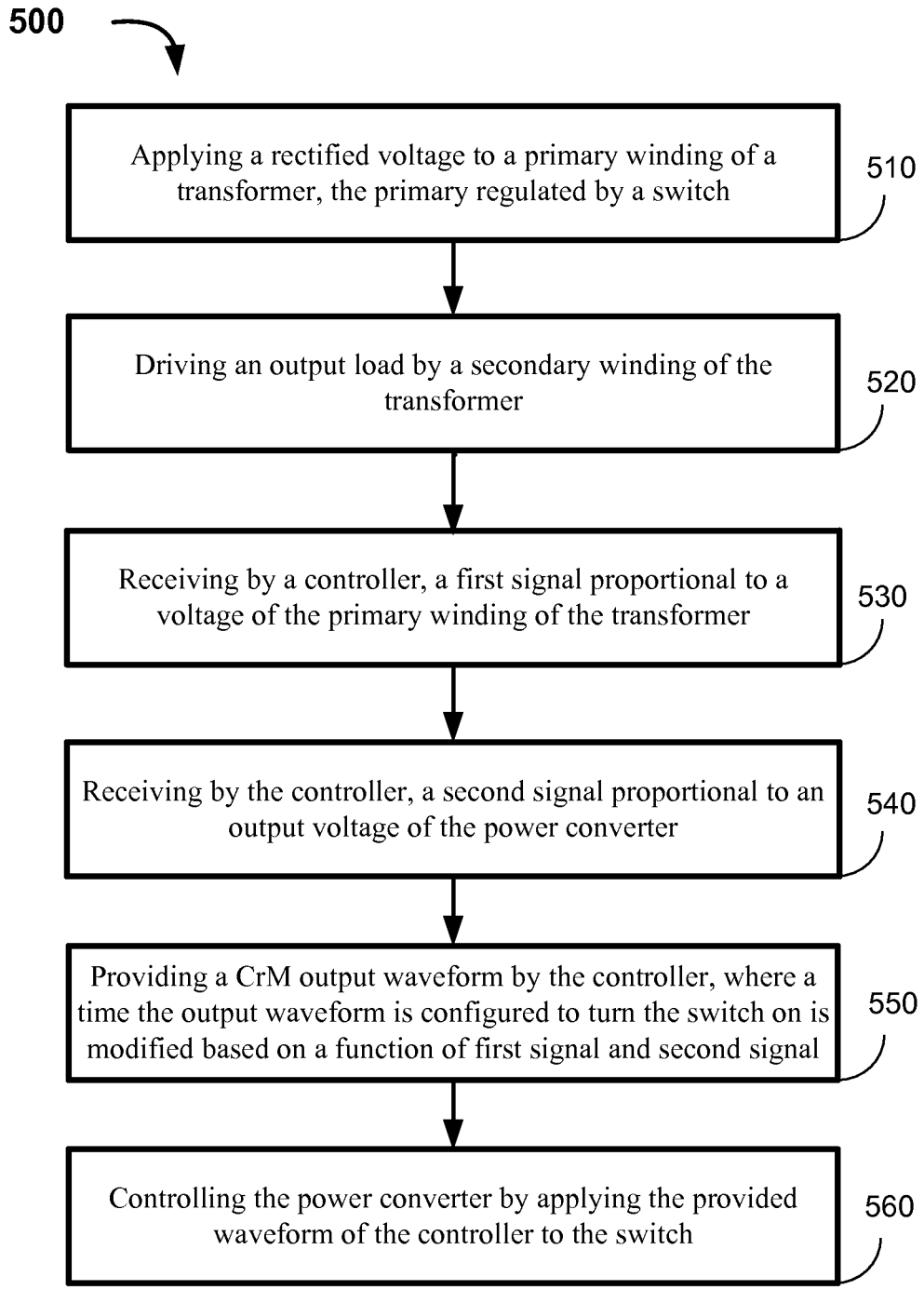
FIG. 5 is an example flow diagram of a method for controlling a power converter of an example circuit as in FIG. 2.

FIG. 5 is a flow diagram of a process 500 for controlling an AC/DC power converter of FIG. 3, In step 510, a rectified voltage is applied to the primary winding of a transformer where the primary winding of the transformer is also coupled to a switch and regulated by the switch. The secondary winding of the transformer is driving an output load in step 520. In step 530, the controller receives a first signal proportional to the voltage across the primary winding of the transformer when the switch is on and in step 540 the controller receives a second signal proportional to the output voltage of the power converter. Providing, in step 550, a CrM output waveform by the controller where a time the waveform is designed to turn the switch on is modified based on a function of the first signal over the second signal. In step 560, the power converter is controlled by applying the waveform generated by the controller in step 550 to the switch noted in step 510. Other implementations are within the scope of the following claims.

What is claimed is:
1. A controller circuit comprising:
a divider module configured to receive a first signal and a second signal and to generate a modification factor proportional to a ratio of the first signal and the second signal;
a critical conducting mode module including a pulse width modulation (PWM) circuit configured to generate a first waveform when the circuit is operating in a critical conducting mode; and
an on-time adjuster module coupled to the divider module and the critical conducting mode module and configured to receive the modification factor and the first waveform and generate a second waveform based on the first waveform and the modification factor.

2. The circuit of claim 1, wherein the first waveform and the second waveform are configured for a critical conducting mode of operation of a power converter.

3. The circuit of claim 1, wherein the critical conducting mode module and the on-time adjuster module are combined into one module coupled to the divider module and configured to generated the second waveform.

4. The circuit of claim 1,
wherein the modification factor is proportional to a ratio of the first signal over the second signal.

5. The circuit of claim 4, further comprising:
a gate driver module coupled between an output node of the circuit and the on-time adjuster module and configured to deliver the second waveform to the output node.

6. The circuit of claim 5, wherein a first input node and a second input node of the circuit are configured to receive the first signal and the second signal, respectively.

7. The circuit of claim 1, wherein the generation of the second waveform includes modifying the first waveform using the modification factor.

8. The circuit of claim 1, wherein an output node of the circuit is coupled to a switch and drives the switch.

9. The circuit of claim 1, wherein the circuit is a part of an integrated circuit incorporated in a chip.

10. The circuit of claim 1, wherein the first waveform and the second waveform are series of pulses.

11. The circuit of claim 1, wherein the circuit is coupled to a power converter for output control.

12. The circuit of claim 8, wherein the switch is combined into the controller circuit and the combination is part of an integrated circuit incorporated in a power converter chip.

13. A power converter comprising:
a transformer magnetically coupling a primary side and a secondary side of the power converter, the transformer including:
 a primary winding configured to be coupled to an output of a rectifier, and
 a secondary winding configured to be coupled to an output load of the power converter;
a switch coupled between the primary winding and a primary side ground and configured to control current flow in the primary winding;
a controller circuit including an output node coupled to the switch, the controller circuit configured for:
 receiving by the controller circuit, a first signal proportional to a voltage across the primary winding of the transformer when the switch is on;
 receiving by the controller circuit, a second signal proportional to an output voltage of the power converter;
 generating a modification factor proportional to a ratio of the first signal and the second signal;
 generating a first waveform configured for a critical conducting mode of operation of the power converter;
 modifying the first waveform based on the modification factor and generating a second waveform based on the modified first waveform; and
 providing the second waveform at the output node of the controller circuit.

14. The circuit of claim 13, wherein a single input node of the controller circuit is configured to receive the first signal and the second signal.

15. The power converter of claim 13, further comprising an auxiliary secondary winding of the transformer coupled to the controller circuit and configured to deliver a signal proportional to the output voltage of the power converter.

16. The power converter of claim 13, further comprising:
an input line filter including an inductor coupled in series with a capacitor and coupled to the alternating input voltage, wherein the capacitor is coupled to an input of the rectifier.

17. The power converter of claim 13, wherein the switch is a transistor.

18. The power converter of claim 13, wherein the rectifier is a diode bridge.

19. The circuit of claim 13, wherein the power converter is an AC/DC power converter.

20. The circuit of claim 19, wherein the AC/DC power converter is an isolated AC/DC power converter.

21. A method comprising:
receiving a first signal by a controller circuit;
receiving a second signal by the controller circuit;
generating a modification factor proportional to a ratio of the first signal over the second signal;
generating a first waveform configured for a critical conducting mode of operation of a power converter;
modifying the first waveform based on the modification factor and generating a second waveform based on the modified first waveform; and
delivering the second waveform at an output of the controller circuit.

22. The method of claim 21, wherein the output of the controller is coupled to a switch and the second waveform drives the switch.

23. The method of claim 22, wherein the switch is combined into the controller circuit and the combination is part of an integrated circuit incorporated in a power converter chip.

24. The method of claim 21, wherein the first waveform and the second waveform are series of pulses.

25. The method of claim 21, wherein the controller circuit is coupled to a power converter for output control.

26. A method comprising:
applying a rectified voltage to a primary winding of a transformer, the primary winding being coupled to a switch and regulated by the switch;
driving an output load by a secondary winding of the transformer;
receiving by the controller, a first signal proportional to a voltage across the primary winding of the transformer when the switch is on;
receiving by the controller, a second signal proportional to an output voltage of the power converter;
providing an output waveform by the controller, wherein the output waveform of the controller is configured for a critical conducting mode of operation of the power converter based on a function of a ratio of the first signal and the second signal; and
controlling the power converter by applying the provided output waveform of the controller to the switch.

27. The method of claim 26, wherein the power converter is an AC/DC power converter.

* * * * *